(12) United States Patent
Danel et al.

(10) Patent No.: US 8,353,988 B2
(45) Date of Patent: Jan. 15, 2013

(54) ROTATING PRESSURE DISTRIBUTOR AND CAROUSEL-TYPE MACHINE FOR TREATING HOLLOW BODIES WHICH IS EQUIPPED THEREWITH

(75) Inventors: Laurent Danel, Octeville-sur-Mer (FR); Marc Mouchelet, Octeville-sur-Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 1271 days.

(21) Appl. No.: 11/869,894

(22) Filed: Oct. 10, 2007

(65) Prior Publication Data
US 2008/0087222 A1  Apr. 17, 2008

(30) Foreign Application Priority Data
Oct. 16, 2006  (FR) .................................. 06 09056

(51) Int. Cl.
 *C23C 16/00* (2006.01)
 *B05D 7/22* (2006.01)
 *F16J 15/46* (2006.01)
(52) U.S. Cl. .................. 118/733; 118/723 E; 427/230; 427/237; 277/645; 277/913
(58) Field of Classification Search .............. 118/723, 118/733; 427/230, 237; 277/645, 913
See application file for complete search history.

(56) References Cited

U.S. PATENT DOCUMENTS

| 2,555,367 | A |   | 6/1951 | Peterson |
| 4,157,020 | A | * | 6/1979 | Young ........................... 464/16 |
| 6,818,068 | B1 |  | 11/2004 | Guiffant et al. |
| 6,919,114 | B1 |  | 7/2005 | Darras et al. |
| 6,997,213 | B1 |  | 2/2006 | Towler et al. |
| 2004/0231748 | A1 | * | 11/2004 | Friede ........................... 141/144 |

FOREIGN PATENT DOCUMENTS

| DE | 19627048 | * | 1/1998 |
| FR | 2 776 540 A1 |  | 10/1999 |
| FR | 2 791 598 A1 |  | 10/2000 |
| JP | 61-175427 U |  | 11/1986 |
| JP | 64-058666 A |  | 3/1989 |
| JP | 04-037520 A |  | 2/1992 |
| JP | 2002-540364 A |  | 11/2002 |

OTHER PUBLICATIONS

English Translation DE19627048 dated Jan. 8, 1998, Burgmer et al.*
Japanese Office Action for Patent Application No. 2007-268818, dated Jan. 5, 2010.

* cited by examiner

*Primary Examiner* — Rakesh Dhingra
(74) *Attorney, Agent, or Firm* — Sughrue Mion, PLLC

(57) ABSTRACT

Rotating pressure distributor (I) for a carousel-type machine for treating hollow bodies in a plurality of identical treatment stations, comprising two rings, (2) fixed and (3) rotating, in sealing contact, the ring (3) having orifices (6) each adapted for being connected to a station and opening onto the contact face (5) thereof, the ring (2) having at least one aperture (7) which may be connected to a pressure source and opening onto the contact face (4) thereof by being on the trajectory of the orifices (6); grease is spread between the contact faces (4, 5) of the two rings (2, 3) to provide the seal; at least one annular channel (13) covers the annular opening (19) of the joint plane (P) and is connected to the atmosphere; in the channel respective flanges (14) are mutually interlaced without contact with one another, forming chicanes; the channel is filled with grease.

15 Claims, 3 Drawing Sheets

ROTATING PRESSURE DISTRIBUTOR AND CAROUSEL-TYPE MACHINE FOR TREATING HOLLOW BODIES WHICH IS EQUIPPED THEREWITH

FIELD OF THE INVENTION

The present invention relates generally to the field of treating hollow bodies, and in particular bottles, in a plurality of identical treatment stations, each intended for treating at least one hollow body and in which, for at least one treatment step, the treatment station is connected to a pressure source, in particular at substantially less than atmospheric pressure, by means of a sealed rotating distributor.

More specifically, the invention relates to improvements made to rotating pressure distributors for carousel-type machines for treating hollow bodies comprising a plurality of identical treatment stations, each intended for treating at least one hollow body, said distributors comprising two coaxial rings, one fixed and the other rotating, which are sealingly in contact against one another by means of respective opposing contact faces defining a joint plane, the rotating ring comprising communication orifices, each capable of being connected to at least one treatment station and opening into the contact face of said rotating ring, the fixed ring comprising at least one aperture which is adapted for being connected to a pressure source of the machine and which opens onto the contact face of said fixed ring so as to be located on the trajectory of the orifices of the rotating ring such that at least one treatment station is connected to the pressure source when the corresponding orifice is coincident with the aperture, grease being spread between the respective contact faces of the two rings to provide the seal relative to the pressure.

BACKGROUND OF THE INVENTION

A rotating distributor of this type is disclosed in the document FR 2 791 598 in the name of the applicant. By referring to FIG. 1 of the accompanying drawings, the rotating distributor, denoted in its entirety by the reference numeral 1, comprises two coaxial rings 2, 3, in principle with substantially vertical axis A in the conditions of use as shown in FIG. 1. One of the rings (the ring 2 located below in FIG. 1) is fixed and the other ring (the ring 3 located above in FIG. 1) is rotating. They are sealingly in contact against one another by means of respective opposing contact faces 4, 5 defining a joint plane P. The rotating ring 3 comprises communication orifices, generically denoted by the reference numeral 6, which are each adapted for being connected to at least one individual treatment station for a container and which open onto the contact face 5 of said rotating ring 3. The fixed ring 2 comprises at least one aperture, generically denoted by the reference numeral 7, which is adapted for being connected, at 8, to a pressure source of the machine and which opens onto the contact face 4 of said fixed ring 2 so as to be located on the trajectory of the orifices 6 of the rotating ring 3; in this manner a treatment station is connected to the pressure source when the corresponding orifice 6 is coincident with the aperture 7. Finally, grease is spread between the respective contact faces 4, 5 of the two rings 2, 3 to prevent dry friction of the face 5 of the rotating ring 3 on the face 4 of the fixed ring 2, but also, and primarily, to provide the seal of the contact of the two faces 4, 5 and thus the seal of the connections between the aperture 7 and the successive orifices 6, with regard to the pressure.

In the design thereof as disclosed and shown in the document FR 2 791 598, the rotating distributor 1 is designed with orifices 6 for connecting to the treatment stations which are distributed over two circumferences, generically denoted by the reference numeral 9, of different diameters (the orifices located on said two respective circumferences 9e, 9i, are denoted respectively 6e, 6i) and with at least two apertures 7e, 7i for connecting to at least one pressure source which are also located on two circumferences of the same diameter as those of said orifices 6e, 6i. This arrangement is clearly seen in FIG. 2 of the accompanying drawings which is a view from below of the rotary ring 3.

In this known arrangement, the orifices 6 and apertures 7 of the respective rings 2, 3 are radially spaced apart from the external and internal peripheral edges, respectively 10e, 10i, 11e, 11i, of the two rings 2, 3. In the embodiment of the rotating distributor 1 illustrated in FIG. 1, the two rings 2, 3 have substantially the same diameter and the orifices 6 of the rotating ring 3 have substantially the same diameter or at least the same radial dimension as the apertures 7 of the fixed ring 2. As a result, the orifices 6 and the apertures 7 are located at the same radial distance De from the edges 11e, 10e of the respective rings 3, 2 and at the same radial distance Di from the respective edges 11i, 10i of the rings 3, 2. In the example shown, the radial distances De and Di are substantially equal, as is seen more clearly in the representation of the rotating ring 3 in a view from below provided in FIG. 2. Moreover, in this example, the distances De, Di are of the same size as the internal diameter of the orifices 6 of the rotating ring 3 as is seen in FIG. 2.

Thus the respective widths De, Di of the seals formed by the lubricant on the external and internal peripheries of the joint plane P are sufficient to provide the required seal.

This known arrangement is currently used in rotating machines typically having 20 treatment stations, and it is completely satisfactory.

However, manufacturers of containers and in particular bottles wish to increase the rates of production in a permanent manner. For certain treatments (for example the depositing of a barrier layer of carbon on the internal face of containers made of thermoplastic material such as PET by using a low pressure plasma), the speed of the sequence of the treatment process in the region of each station may not be significantly increased. A significant increase in the rate of production may thus only be envisaged by increasing the number of treatment stations. It is in this manner that the applicant envisages to develop a new machine in which the number of the treatment stations is markedly increased, typically almost doubled.

In regard to the rotating distributor, this may be translated by a corresponding increase in the connections to be provided, i.e. typically by almost doubling the number of communication orifices to be provided on the rotating ring.

However, the rings of the rotating distributor are pieces of large size which are very heavy; typically, in current machines equipped with 20 treatment stations, the rings have a diameter of approximately 0.60 meters and an individual weight in the order of 110 kg. Whilst it is possible to increase the external diameter slightly further, the capacity of the machines required for the manufacture of these rings nevertheless imposes a limit which it is not possible to exceed, which however would be necessary to distribute the increased number of communication orifices over the same number (typically two) of circumferences of different diameters. So that the rings maintain approximately their current diameter, it is therefore necessary to distribute the communication orifices over a greater number (typically three, even four) of circumferences of different diameters.

This object is possible to achieve, for example, by reducing the diameter d of the central recess 12 of the rings 2, 3 and by occupying to a maximum extent the available surface in the rings. This results in arranging the orifices 6 and the apertures 7 located on the respectively external and internal extreme circumferences 9e, 9i, as close as possible to the respectively external and internal peripheral edges 10e, 11e, 10i, 11i, of the rings 2, 3. By way of example, FIG. 3 shows in a view from below a rotating ring 3 designed according to a configuration of this type with the orifices 6 distributed in three groups 6e, 6m, 6i, located respectively on three circumferences 9e, 9m, 9i, respectively external, median and internal.

Nevertheless, in this case, the distances De' between the external edges of the orifices 6e and the external edge 11e of the ring 3 and Di' between the internal edges of the orifices 6i and the internal edge 11i of the ring 3 (and similarly for the fixed ring 2) are considerably reduced (typically by approximately 49 mm over the current machines) and as a result the widths of the lubricating joints on the external and internal peripheries of the joint plane become insufficient to provide the required seal.

SUMMARY OF THE INVENTION

The object of the invention is to propose an improved arrangement of the rotating distributor which makes it possible to respond to the sealing requirements in the presence of pressure, in particular at substantially less than atmospheric pressure, without a substantial increase in the external diameter of the rings, without extensive structural modification of the rotating distributor, and without a significant increase in cost in the manufacture and maintenance of the rotating distributor.

To this end, the invention proposes a rotating distributor of pressurized fluid for a carousel-type machine for treating hollow bodies of the type disclosed in the preamble which, being designed according to the invention, is characterized in that it comprises at least one annular channel which covers the annular opening of the joint plane and which is connected to the atmosphere, in that inside this channel respective mutually interlaced flanges are provided without contact with one another, forming chicanes, and in that the channel is filled with grease.

It may be provided that the rotating distributor comprises an external annular channel covering the external annular opening of the joint plane, or that it comprises an internal annular channel covering the internal annular opening of the joint plane. In a preferred embodiment, the rotating distributor combines the two arrangements and comprises an external annular channel covering the external annular opening of the joint plane and an internal annular channel covering the internal annular opening of the joint plane.

As a result of this arrangement, a reserve of grease available for supplying permanently the interface between the two rings is provided, in particular when the joint is intended to distribute a pressure which is lower, even much lower, than atmospheric pressure which tends to "pump" the grease from the external and internal peripheries of the rotating joint.

In a preferred embodiment, it is provided that the annular channel comprises two non-contiguous housing panels which are respectively attached to the two rings and which extend approximately radially from the two rings, respectively being approximately parallel to one another. Advantageously therefore, the mutually interlaced flanges may be attached to these two respective panels, may be substantially cylindrical in revolution, and may extend substantially perpendicular to the joint plane. It may, in particular, be provided that the annular channel thus formed is the external annular channel.

In a further preferred embodiment, it is provided that the annular channel comprises a cylindrical partition defining an annular chamber opposite the annular opening of the joint plane, and that the partition has one of its circular edges attached to a ring, in particular to the fixed ring when the axis of the rings is substantially vertical, and its other circular edge which is non-contiguous with the other ring.

Advantageously therefore, the mutually interlaced flanges may extend substantially radially and may be attached to the two rings and to the partition. It may also be provided, in particular, that the annular channel thus formed is the internal annular channel: such a channel has a relatively small radial dimension and only occupies a small radial space in the central recess of the rings which is, moreover, penetrated by numerous connections.

As clearly emerges from the explanations given above, a rotating distributor designed according to the invention may be applied in a most particularly advantageous manner in the case, which is common in practice, where the two coaxial rings have a substantially vertical axis and are arranged above one another and where it is the lower ring which is fixed and the upper ring which is rotating. Similarly, an application of the arrangements of the invention which is more particularly advantageous relates to the case where the two fixed and rotating rings respectively have orifices and apertures distributed in a plurality of groups, and in particular at least three groups, arranged over different diameters. Also, an application which is more particularly advantageous of the arrangements of the invention relates to the case where the rotating distributor is designed to distribute a pressure which is lower, even much lower, than atmospheric pressure.

A rotating distributor designed as has been explained above according to the invention may be applied in a particularly advantageous manner in a carousel-type machine for the treatment of hollow bodies, of the type comprising a plurality of identical treatment stations capable of treating at least one hollow body, said machine being equipped with an individual rotating distributor for at least one treatment step, to connect successively each treatment station with at least one pressure source, in particular at a pressure which is lower, even much lower, than atmospheric pressure. In a preferred application, it may be a machine for depositing, by means of a low-pressure plasma, a barrier coating, in particular made of carbon, on the internal face of the hollow bodies, in particular of bottles, made of thermoplastic material, in particular PET, such as for example the machine of which the basic design is disclosed in the document FR 2 776 540 in the name of the applicant.

BRIEF DESCRIPTION OF THE DRAWINGS

The invention will be better understood by reading the description which follows of specific preferred embodiments given by way of purely illustrative example. In this description, reference is made to the accompanying drawings, in which.

DETAILED DESCRIPTION OF THE INVENTION

Figure 1:
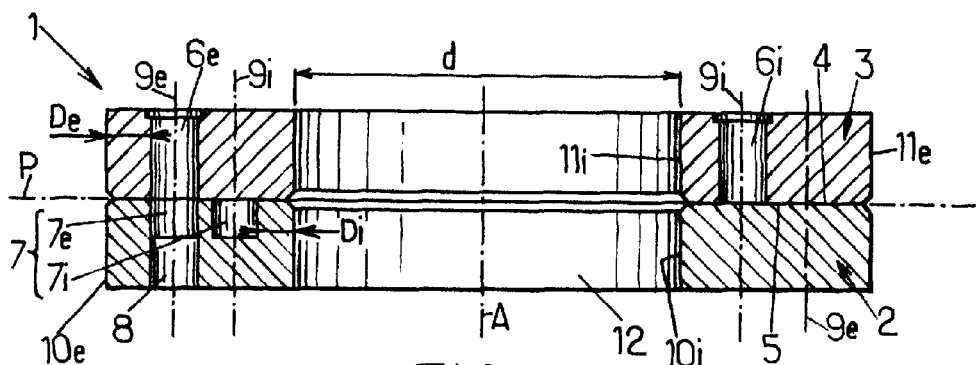
FIG. 1 is a view from the side in diametric section of a rotating distributor of the prior art as revealed in the document FR 2 791 598 in the name of the applicant.
Figure 2:
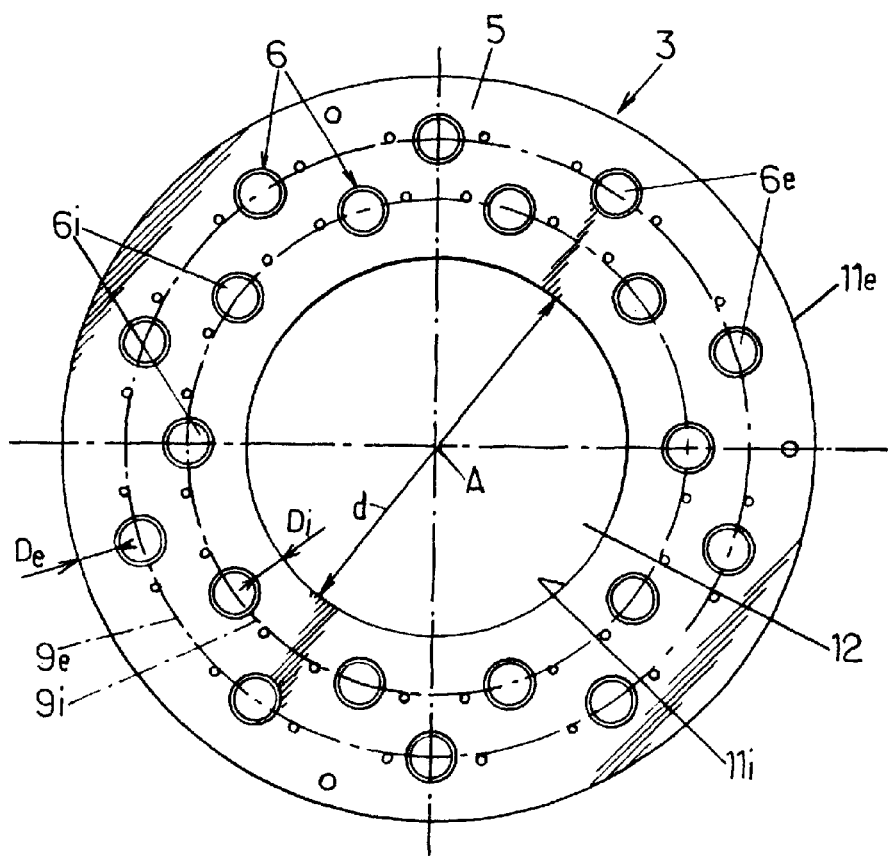
FIG. 2 is a view from below of the rotating ring of the rotating distributor of FIG. 1.
Figure 4:
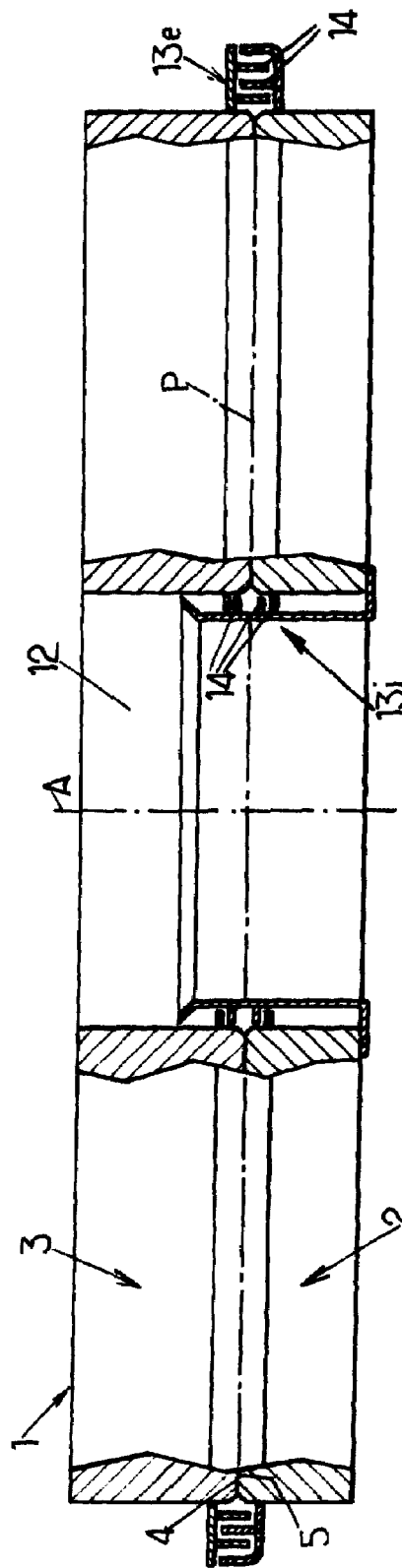
FIG. 4 is a view from the side which is partially broken away of a rotating distributor arranged according to the invention.

Reference is now made more specifically to FIG. 4 in which the members or similar parts to those in FIG. 1 are denoted by the same reference numerals.

Figure 3:
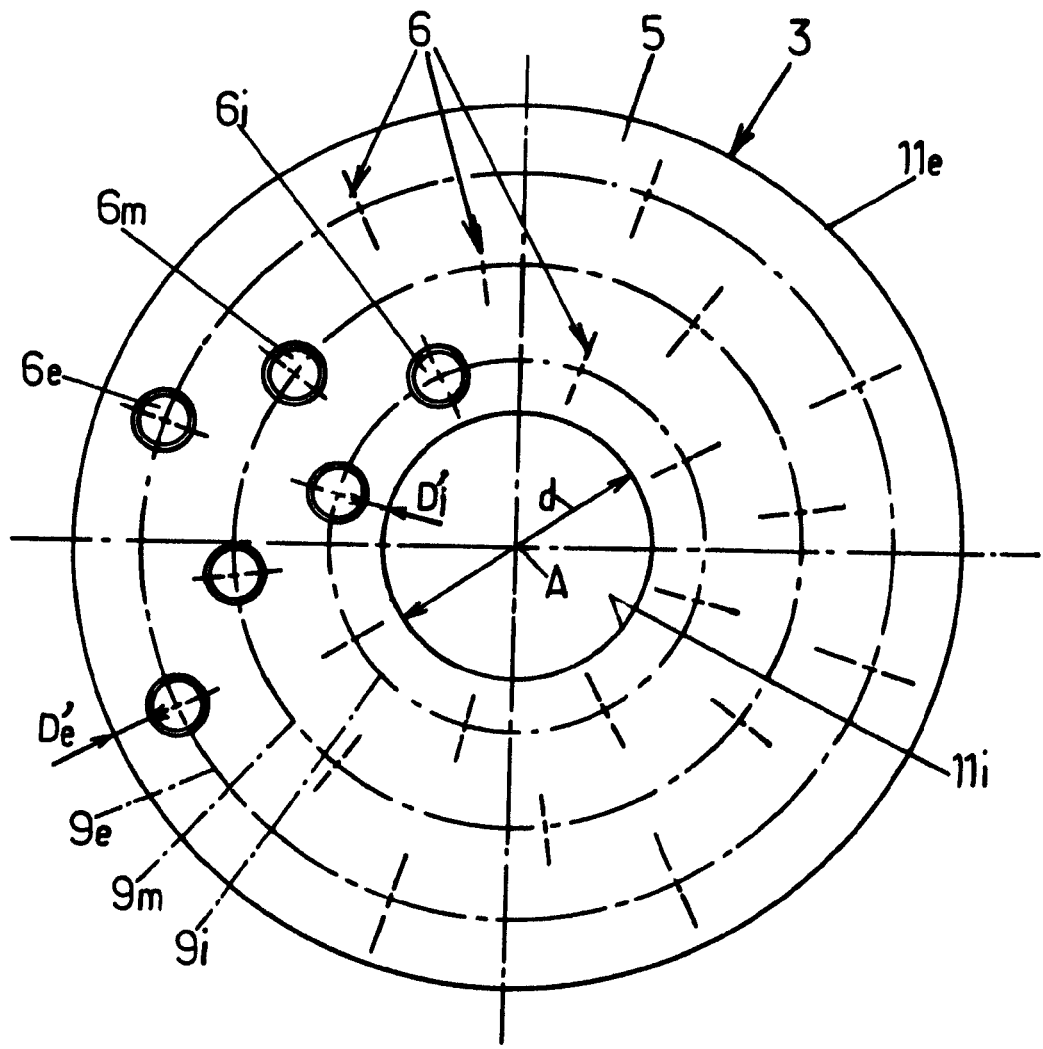
FIG. 3 is a view from below of a rotating ring of a modified rotating distributor for the connection of an increased number of treatment stations.

The specific design of the rings 2, 3 which are respectively fixed and rotating, is not taken into consideration within the context of the invention, with the exception that, as shown in FIG. 3, the geometric design of the rings leads to respectively external and internal peripheral grease joints, which have insufficient widths to provide the required seal, in particular when the rotating distributor is intended to distribute a pressure which is lower, even much lower, than atmospheric pressure.

According to the invention, the rotating distributor 1 is made to comprise at least one annular channel, generically denoted by the reference numeral 13, which covers the annular opening of the joint plane P and which is connected to the atmosphere; inside the channel 13 respective mutually interlaced flanges 14 are provided without contact with one another, forming chicanes, and the channel 13 is filled with grease. Said channel may be an external annular channel 13e covering the external annular opening of the joint plane P as visible to the right and to the left on the view of FIG. 4. Said channel may be an internal annular channel 13i covering the internal annular opening of the joint plane P, as visible in the centre of the view of FIG. 4. In one preferred embodiment illustrated in FIG. 4, the rotating distributor 1 combines the two arrangements and has an external annular channel 13e covering the external annular opening of the joint plane P and an internal annular channel 13i covering the internal annular opening of the joint plane P.

Different solutions may be envisaged to produce the channel 13.

Figure 5:
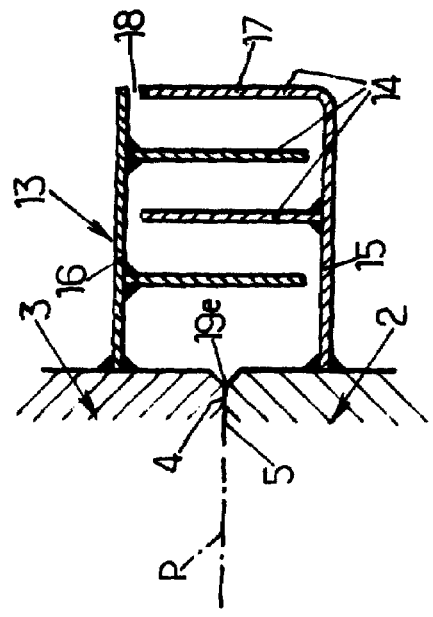

In a first embodiment, visible in FIG. 4 and shown in larger scale in FIG. 5, it is provided that the annular channel 13 comprises two non-contiguous housing panels, respectively a lower panel 15 which is attached to the fixed ring 2 and an upper panel 16 which is attached to the rotating ring 3. The two panels 15, 16 extend approximately radially from the two respective rings 2, 3 and are approximately parallel to one another. In the example illustrated in FIG. 5, the upper panel 16 is approximately planar, whilst the lower panel 15 is shaped into a curved part of L-shaped section forming, in an integral manner, the peripheral wall 17 of the channel. The free edges of the upper panel 16 and of the peripheral wall 17 extend adjacent to one another but without being contiguous so as to define a slot 18 for connecting the internal volume of the channel to the atmosphere. Taking account of the fact that, in the example considered, the rotating distributor 1 has a substantially vertical axis, the slot 18 is located in the upper part of the channel 13.

The two housing panels 15, 16 are fixed to respective rings 2, 3 in any appropriate manner, for example by welding or by a screw-bolt connection.

On their respective faces turned towards the interior of the channel, the two housing panels 15, 16 support said deflecting flanges 14 which are concentric and attached, for example by welding, alternately to two housing panels and thus mutually interlaced, extending substantially perpendicular to the joint plane P. Thus a trajectory in chicanes is defined between the slot 18 and the external opening 19e of the joint plane P.

The internal volume of the channel 13 is filled with lubricant, which lubricant may flow freely in the interface of the joint plane P as a result of the difference in pressure between the atmospheric pressure present in the slot 18 and the pressure lower than the atmospheric pressure in the region of the joint plane P.

The embodiment of the channel 13 which has been described above with reference to FIG. 5 has a substantial radial spatial requirement. Also, in the preferred embodiment of the rotating distributor 1 which is illustrated in FIG. 4, it is the external channel 13e which is formed as shown in FIG. 5 due to the fact that around the distributor 1 sufficient radial space is available.

As an alternative solution, recourse may be made to a further embodiment of the channel 13, it being, however, understood that this further embodiment is not exclusive for the arrangement of the rotating distributor in the central recess 12 which is explained hereinafter and could be implemented as an external channel.

Figure 6:
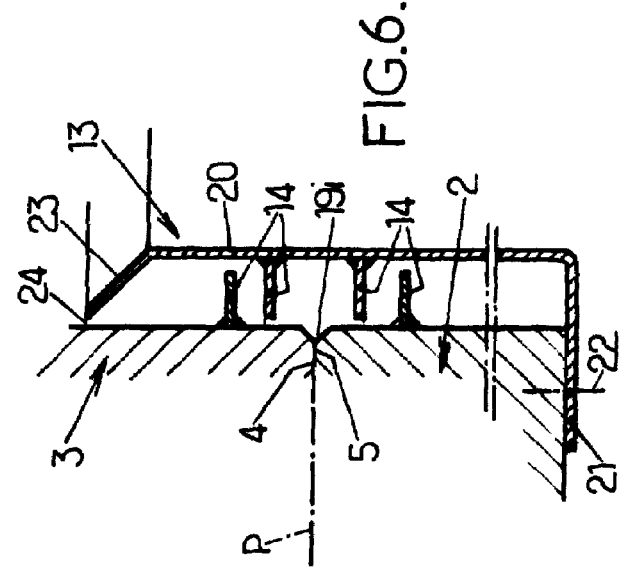
FIGS. 5 and 6 are schematic views, in transverse section and in larger scale, of two possible embodiments of channels for lubricant capable of equipping the rotating distributor of FIG. 4.

As is visible in FIG. 4 and shown in larger scale in FIG. 6, the annular channel 13 comprises a cylindrical partition 20 defining an annular chamber opposite the annular opening 19i of the joint plane P. The simplest solution consists in that, as illustrated, the partition 20 is attached to the fixed ring 2 in any appropriate manner; in particular it could be welded to the ring 2, for example to the internal lateral face thereof; by way of a variant, in FIG. 6 the partition 20 has been shown extending below as far as the lower face of the fixed ring 2 and bent by an overlap 21 which is attached, for example by a screw-bolt connection 22 as shown, to said lower face.

The upper part 23 of the partition 20 is bent in the direction of the rotating ring 3. Taking account of the fact that in the example more particularly considered, the rotating distributor 1 has a substantially vertical axis with the rotating ring 3 located on the top, the edge of the upper part 23 of the partition 20 is non-contiguous with the lateral wall of the ring 3 so as to define a slot 24 for connecting the internal volume of the channel with the atmosphere.

Naturally, by way of a variant the partition 20 could be attached to the rotating ring 3 with, however, a substantially complicated structure to provide the sealed connection of the lower edge of the partition 20 to the fixed ring 2.

On their mutually opposing faces, the partition 20 and the lateral faces of the rings 2 and 3 support, for example by welding, said deflecting flanges 14 alternately on both sides of the internal opening 19i of the joint plane P. The flanges 14 are mutually interlaced and extend substantially radially. Thus trajectories in chicanes are formed on the one hand, between the slot 24 and the opening 19i and, on the other hand, between the bottom of the internal volume of the channel which forms the principle reserve of lubricant and the opening 19i of the joint plane P.

The internal volume of the channel 13 is filled with lubricant, said lubricant being able to flow freely into the interface of the joint plane P as a result of the pressure difference between the atmospheric pressure present at the slot 24 and the pressure which is lower than atmospheric pressure present in the region of the joint plane P.

Taking account of its relatively small radial extension, the annular channel thus formed is perfectly suitable for producing the internal annular channel 13i.

As emerges clearly from the explanations given above, it is most particularly advantageous to equip a rotating distributor with at least one channel according to the invention when the two fixed and rotating rings 2, 3 respectively have orifices 6 and apertures 7 distributed in a plurality of groups arranged on concentric circumferences 9 of different diameters, and/or also when the rotating distributor is intended to distribute a pressure which is lower, even much lower, than atmospheric pressure.

In these conditions, it is apparent that the invention should find a preferred, although not exclusive, application in a carousel-type machine for the treatment of hollow bodies, of the type comprising a plurality of identical treatment stations, capable of treating at least one hollow body, said machine being equipped with an individual rotating distributor, for at least one treatment step, to connect successively each treatment station with at least one pressure source, and the rotating distributor being designed according to the invention as has been explained above.

An application more specifically targeted by the invention in this context relates to a carousel-type machine as indicated above which consists of a machine for depositing, by means of a low pressure plasma, a barrier coating, in particular made of carbon, on the internal face of the hollow body, in particular of bottles made of thermoplastic material, in particular PET.

What is claimed is:

1. A rotating pressure distributor for a carousel-type machine for treating hollow bodies comprising a plurality of identical treatment stations each intended for treating at least one hollow body, said rotating distributor comprising two coaxial rings, one fixed and the other rotating, which are sealingly in contact against one another by means of respective opposing contact faces, defining a joint plane, the rotating ring comprising communication orifices, each adapted for being connected to at least one treatment station and opening onto the contact face of said rotating ring, the fixed ring comprising at least one aperture adapted for being connected to a pressure source of the machine and opening onto the contact face of said fixed ring so as to be located on the trajectory of the orifices of the rotating ring such that at least one treatment station is connected to the pressure source when the corresponding orifice is coincident with the aperture, grease being spread between the respective contact faces of the two rings to provide the seal relative to the pressure,
   wherein at least one annular channel is provided which covers an annular opening of the joint plane and which is connected to the atmosphere by a separate annular opening defined by a fixed element and a rotating element,
   wherein inside this channel respective mutually interlaced flanges are provided without contact with one another, forming chicanes, and
   wherein the channel is filled with grease.

2. The rotating distributor according to claim 1, comprising an external annular channel covering an external annular opening of the joint plane.

3. The rotating distributor according to claim 1, comprising an internal annular channel covering an internal annular opening of the joint plane.

4. The rotating distributor according to claim 1, wherein the annular channel comprises two non-contiguous housing panels which are respectively attached to the two rings which extend approximately radially from the two respective rings and which are approximately parallel to one another.

5. The rotating distributor according to claim 4, wherein the mutually interlaced flanges are attached to these two respective panels, are substantially cylindrical in revolution, and extend substantially perpendicular to the joint plane.

6. The rotating distributor according to claim 5, wherein the annular channel thus formed is the external annular channel.

7. The rotating distributor according to claim 1, wherein the annular channel comprises a cylindrical partition defining an annular chamber opposite the annular opening of the joint plane, and wherein the partition has one of its circular edges attached to a ring and its other circular edge non-contiguous with the other ring.

8. The rotating distributor according to claim 7, wherein the mutually interlaced flanges extend substantially radially and are attached to the two rings and to the partition.

9. The rotating distributor according to claim 8, wherein the annular channel thus formed is the internal annular channel.

10. The rotating distributor according to claim 1, wherein the two coaxial rings have a substantially vertical axis and are arranged above one another and wherein the lower ring is fixed and the upper ring is rotating.

11. The rotating distributor according to claim 1, wherein the two fixed and rotating rings respectively have orifices and apertures distributed in a plurality of groups arranged on concentric circumferences of different diameters.

12. The rotating distributor according to claim 1, wherein the pressure to be distributed is lower than atmospheric pressure.

13. A carousel-type machine for treating hollow bodies, of the type comprising a plurality of identical treatment stations capable of treating at least one hollow body, said machine being equipped with an individual rotating distributor for at least one treatment step, to connect successively each treatment station with at least one pressure source, wherein the rotating distributor is designed according to claim 1.

14. The carousel-type machine according to claim 13, which is a machine for depositing by means of a low pressure plasma, a barrier coating, in particular made of carbon, on the internal face of the hollow body, in particular of bottles, made of thermoplastic material, in particular PET.

15. A rotating pressure distributor for a carousel-type machine for treating hollow bodies, the rotating distributor comprising:
   a fixed ring comprising a corresponding contact face;
   a rotating ring comprising a corresponding contact face;
   the fixed ring coaxial with the rotating ring,
   the contact face of the fixed ring sealingly in contact with the contact face of the rotating ring in a joint plane and defining an annular opening;
   the rotating ring comprising communication orifices, each communication orifice adapted to be connected to at least one treatment station and opening onto the contact face of the rotating ring;
   the fixed ring comprising at least one aperture adapted to be connected to a pressure source and opening onto the contact face of the fixed ring so as to be in communication with one of the communication orifices;
   grease spread between the contact face of the fixed ring and the contact face of the rotating ring to provide a seal;
   an annular channel covering the annular opening of the joint plane; the annular channel open to the atmosphere through a separate annular opening in the annular channel and formed by a fixed element attached to the fixed ring and a rotating element attached to the a rotating ring;
   the annular channel comprising interlaced flanges separated from one another; and
   the annular channel filled with grease.

* * * * *